United States Patent

Faust et al.

[11] Patent Number: 6,068,332
[45] Date of Patent: May 30, 2000

[54] CUSHIONING FOR A SEAT PART AND/OR A BACKREST FOR A VEHICLE SEAT

[75] Inventors: Eberhard Faust; Karl Pfhaler, both of Stuttgart, Germany

[73] Assignee: DaimlerChrysler AG, Stuttgart, Germany

[21] Appl. No.: 09/247,602

[22] Filed: Feb. 10, 1999

[30] Foreign Application Priority Data

Feb. 10, 1998 [DE] Germany .......................... 198 05 178

[51] Int. Cl.⁷ .................................................. B60N 2/56
[52] U.S. Cl. ................................ 297/180.13; 297/180.11; 5/652.2
[58] Field of Search ............................ 297/180.11, 180.13, 297/180.14, 452.42, 452.43, 452.45; 5/652.1, 652.2, 724, 726

[56] References Cited

U.S. PATENT DOCUMENTS

| 4,413,857 | 11/1983 | Hayashi | 297/180.11 |
| 5,749,111 | 5/1998 | Pearce | 5/652.1 X |
| 5,870,785 | 2/1999 | Hoorens | 5/724 X |

FOREIGN PATENT DOCUMENTS

| 2 641 956 | 7/1990 | France . | |
| 2949282 | 6/1981 | Germany | 5/652.1 |
| 42 00 825 A1 | 7/1993 | Germany . | |
| 196 28 698 C1 | 10/1997 | Germany . | |

OTHER PUBLICATIONS

European Search Report.

*Primary Examiner*—Peter R. Brown
*Attorney, Agent, or Firm*—Evenson McKeown Edwards & Lenahan P.L.L.C.

[57] ABSTRACT

A cushioning for a seat part and/or a backrest of a vehicle seat, having a ventilation layer through which air can flow and which comprises an air-permeable and water-permeable top and bottom layer. Elastically bendable, mutually spaced spacing webs or threads hold these layers at a distance and connect them with one another. Fans or ventilators blow air into the ventilation layer. For ensuring an intensive ventilation of the entire cushioning surface of the vehicle seat provided for the seat user, specifically also when the fan outputs available for the ventilation are limited, the density of the spacing webs or threads is selected to be larger in the longitudinal direction of the cushioning than in the width direction of the cushioning. Thereby, the air is distributed over the entire seat width and backrest width before flowing widely in the longitudinal direction of the seat part or of the backrest along under the cushioning surface.

17 Claims, 1 Drawing Sheet

CUSHIONING FOR A SEAT PART AND/OR A BACKREST FOR A VEHICLE SEAT

BACKGROUND OF THE INVENTION

This application claims the priority of 198 05 178.6-16, filed Feb. 10, 1998, the disclosure of which is expressly incorporated by reference herein.

The present invention relates to a cushioning for a seat part and/or a backrest of a motor vehicle, and more particularly, to a cushioning having a ventilation layer through which air can flow and which consists of an air-permeable and water-permeable top and bottom layer and of elastically bendable, mutually spaced spacing webs or threads which hold these layers at a distance and connect them with one another, and having fans or ventilators for blowing air into the ventilation layer.

In a known cushioning described in DE 42 00 825 A1, the spacing webs or spacing yarns are spaced in one direction parallel to one another. The hollow spaces situated in-between result in a constant cross-section through which air is delivered from a heater, with an air conditioner or a fan provided specifically for this purpose. The air flowing through the ventilation layer generates a temperature and moisture gradient by which the water moisture or sweat resulting from transpiration is removed from the cushioning surface which clearly improves the micro air conditioning on the cushioning surface.

In another known cushioning for vehicle seats described in DE 196 28 698 C1, a multiplicity of miniature fans is integrated in the cushioning. These miniature fans are arranged to be distributed over the cushioning surface and blow air from the area below the vehicle seat into the ventilation layer which consists, for example, of a spaced knit. When the vehicle seat is unoccupied, the ventilation air flows through the air-permeable cushioning surface and cools the cushioning surface, which is considerably heated, for example, by sun radiation, relatively fast down to comfortable temperatures. When the seat is occupied, the air flows in the cushioning in parallel to the cushioning surface, is charged with transpiration moisture and leaves the cushioning only at the cushioning end, optionally by separate, constructively provided ventilation holes in the cushioning.

SUMMARY OF THE INVENTION

An object of the present invention is to ensure an intensive ventilation of an entire cushioning surface provided for the seat user, specifically also when the fan output available for the ventilation is limited.

This object has achieved in accordance with the present invention by providing that density of the spacing webs or threads is selected to be larger in the longitudinal direction of the cushioning than in the width direction of the cushioning.

The cushioning for the seat part and/or the backrest of a vehicle seat according to the present invention has the advantage that, because of the different density of the mutually spaced spacing webs or spacing threads in mutually rectangular cushioning dimensions, the air which flows from the ventilators or fans by way of locally limited partial surfaces into the ventilation layer is uniformly distributed in the transverse direction over the entire cushioning surface before it resumes its flow in the longitudinal direction of the cushioning. As a result, the air is distributed uniformly over the cushioning surface and an optimal seat ventilation is achieved while the energy consumption is low.

According to a currently preferred embodiment of the invention, lamella-type air guiding elements are arranged in the ventilation layer which, in the manner of guide blades, are set diagonally in the direction of the top layer for deflecting air to the top layer of the ventilation layer. As a result of this structure of the ventilation layer, the air flowing there through is provided with a movement component in the direction of the cushioning surface so that, when the seat is unoccupied, the air is preferably blown through the air-permeable cushioning cover spanning the cushioning surface, which leads to a fast cooling of the cushioning surface heated, for example, by sun radiation.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
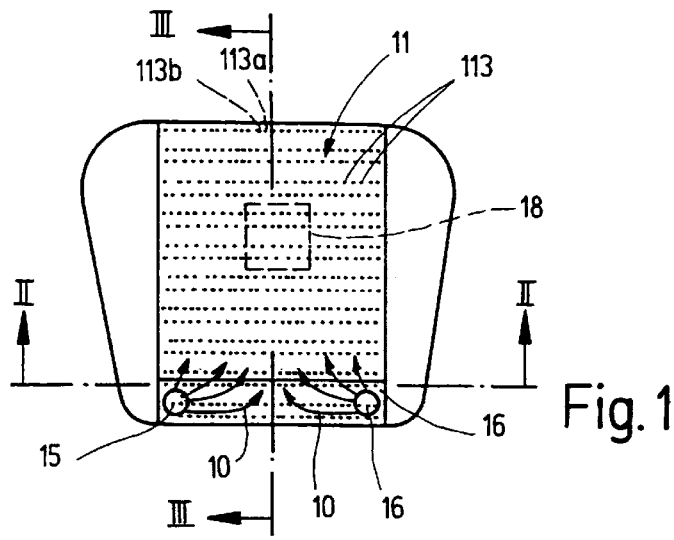
FIG. 1 is a schematic, partially cut-open top view of a cushioning for a seat part of a motor vehicle.

The cushioning for a seat part of a vehicle seat, which FIG. 1 shows as a sectional top view in the seat surface area and which can be used in an identical manner also for the backrest of the vehicle seat, comprises a ventilation layer 11 made, for example, of a wide-meshed spaced knit, through which air can flow; an air-impermeable pressure distribution layer 12 made of a nonwoven or rubberized-hair material of a high density; an air-permeable cushioning cover 13 made of a textile fabric or perforated leather or imitation leather which spans the cushioning surface facing away from the pressure distribution layer 12; and a cover stuffing 14 which is placed between the ventilation layer 11 and the cushioning cover 13 and consists of quilting cotton, a wool nonwoven or an open-pored or at least partially perforated foamed material or of a cotton-foam combination.

On the rearward cushioning area facing the backrest, air is blown into the ventilation layer 11 from below by two fans or ventilators 15 schematically outlined in FIG. 1, for the purpose of which the air-impermeable pressure distribution layer 12 has recesses which are congruent with the blow-out openings of the fans 15. In the area of the introduction of air, the top side of the ventilation layer 11 which faces away from the pressure distribution layer 12 is covered by an air-impermeable blocking layer 16, such as a foil, which prevents the air from escaping directly through the cushioning surface but is first guided in the direction of the surface tangent.

Figures 2, 3:
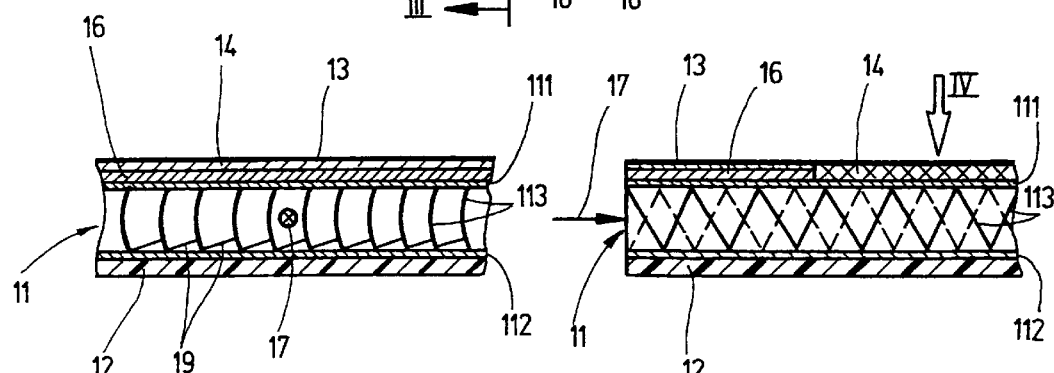
FIG. 2 is a schematic cutout-type sectional view along line II—II in FIG. 1.
FIG. 3 is a schematic cutout-type sectional view along line III—III in FIG. 1.

As illustrated in FIGS. 2 and 3, the ventilation layer 11 consists of an air-permeable and water-permeable top layer 111, an air-permeable and water-permeable bottom layer 112; and a multiplicity of elastically bendable and mutually spaced spacing webs or spacing threads 13 which connect and hold the top layer 111 and the bottom layer 112 at a distance from one another. The spacing webs or spacing threads 113, which are dotted in FIG. 1, are arranged such that their density, that is, their number per surface unit, is selected to be larger in the longitudinal direction of the cushioning than in the cushioning width direction. As a result, the air flowing in at the rearward end of the cushioning is distributed over the whole cushioning width before it flows widely in the longitudinal direction along under the cushioning surface. The air flow is symbolized in FIG. 1 by arrows 10, and the air flow in the longitudinal direction of the cushioning, thus, in the case of the seat cushioning, along the seat depth and, in the backrest cushioning, along the backrest height, is illustrated by the arrow 17 in FIGS. 2 to 5.

The different density of the spacing webs or spacing threads 113 can be easily recognized by the square 18 indicated by a dash line in FIG. 1. The air passage surface for the air flowing in the longitudinal direction of the cushioning comprises ten spacing webs or spacing threads 113 in the square which extend approximately perpendicularly to the plane of the drawing sheet. The air passage surface of the same size for the air flowing in the direction of the cushioning width, in the square 18, has only four spacing webs or spacing threads 113. The flow resistance of the ventilation layer 11 in the longitudinal direction of the cushioning is therefore higher than the flow resistance of the ventilation layer 11 in the direction of the seat width.

Figures 4, 5:
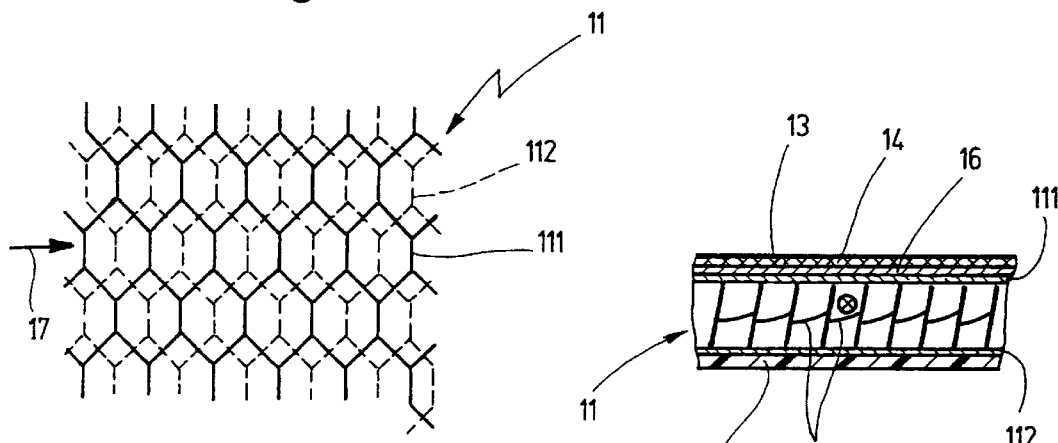
FIG. 4 is a schematic cutout-type top view of a ventilation layer of the cushioning in FIGS. 1 to 3.
FIG. 5 is a schematic view of the same representation as in FIG. 2 of a modified embodiment cushioning.

In the case of the ventilation layer constructed as a spaced knit, as illustrated in a cutout-type manner in FIG. 4, the top layer 111 and the bottom layer 112 can have a honeycomb structure. Each spacing web or spacing thread 13 illustrated in FIGS. 2 and 3 will then be composed of a bundle of fibers which are knotted into the honeycomb webs of the top layer 111 and the bottom layer 112. In this embodiment, the spacing webs or spacing threads 113 are more densely situated in the weft direction than in the warp direction so that the spaced knit is aligned such in the cushioning that its weft direction extends in the longitudinal direction of the cushioning. The flow-through direction of the spaced knit from the rearward cushioning area containing the fans 15 to the forward cushioning edge is indicated in FIG. 4 again by means of an arrow 17. For differentiating between the top layer 111 and the bottom layer 112, the offset bottom layer 112 is shown by a broken line.

In the same manner, FIG. 3 shows, only for the purpose of a differentiation, by way of a solid line, the spacing webs or spacing threads 113 situated in the forward row 113a (FIG. 1) and, by way of a dash line, the spacing webs or spacing threads 113 situated in the adjacent rearward row of webs 113b (FIG. 1). For reasons of clarity, FIG. 4 does not show the spacing webs or threads 113.

For improving the ventilation of the cushioning surface when the vehicle seat is unoccupied for the purpose of a faster cooling of the cushioning surface heated, for example, by sun radiation, lamella-type air guiding elements 19 are arranged in the ventilation layer 11, which are set diagonally in the manner of guide blades for deflecting the air toward the cushioning surface in the direction of the top layer 111 of the ventilation layer 11. The diagonal setting can take place in the direction of the cushioning width as well as in the longitudinal direction of the cushioning or in both directions.

In the embodiment of FIG. 2, the air guiding elements 19 are arranged directly on the bottom layer 112. In the embodiment of FIG. 5, the air guiding elements 19 are arranged slightly below the center of the spacing webs or threads 113. In the embodiment of FIG. 5, the spacing webs or threads 113 have a linear construction and are slightly tilted, while, in the embodiment of FIG. 2, they are slightly curved. In both cases, the spacing webs or threads 113 are elastically bendable, so that they slightly compress when the cushion surface is stressed but cannot be bent to such an extent that the top layer 111 and the bottom layer 112 can come in contact with one another without any spacing.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Cushioning for a seat part and/or a backrest of a vehicle seat, comprising a ventilation layer configured so that air can flow therethrough having an air-permeable and water permeable top layer and bottom layer as well as elastically bendable, mutually spaced spacing webs or threads configured to hold and connect the top and bottom layers, and fans or ventilators operatively arranged relative to the ventilation layer for blowing air into the ventilation layer, wherein density of the spacing webs or threads is selected to be larger in a longitudinal direction of the cushioning than in a width direction of the cushioning.

2. The cushioning according to claim 1, wherein the ventilation layer comprises a spaced knit having a larger density in a weft direction than in a warp direction.

3. The cushioning according to claim 1, wherein lamella-type air guiding elements are operatively arranged in the ventilation layer relative to the spacing webs or spacing threads and are set diagonally in a guide blade-type manner for deflecting the air toward the cushioning surface in the direction of the top layer.

4. The cushioning according to claim 3, wherein the ventilation layer comprises a spaced knit having a larger density in a weft direction than in a warp direction.

5. The cushioning according to claim 3, wherein the air guiding lamellae are arranged between the spacing webs or spacing threads with a tilting thereof which extends in at least one direction of the cushioning width and in the longitudinal direction of the cushioning.

6. The cushioning according to claim 3, wherein the air guiding elements are arranged directly on the bottom layer.

7. The cushioning according to claim 6, wherein the air guiding lamellae are arranged between the spacing webs or spacing threads with a tilting thereof which extends in at least one direction of the cushioning width and in the longitudinal direction of the cushioning.

8. The cushioning according to claim 3, wherein the air guiding elements are arranged in centrally of or below a center of the spacing webs or threads.

9. The cushioning according to claim 8, wherein the air guiding lamellae are arranged between the spacing webs or spacing threads with a tilting thereof which extends in at least one direction of the cushioning width and in the longitudinal direction of the cushioning.

10. The cushioning according to claim 1, wherein the introduction of air into the ventilation layer occurs on the bottom layer, and an area of the top layer which is situated opposite an area of the air introduction is covered by an air-impermeable blocking layer.

11. The cushioning according to claim 10, wherein the ventilation layer comprises a spaced knit having a larger density in a weft direction than in a warp direction.

12. The cushioning according to claim 11, wherein lamella-type air guiding elements are operatively arranged in the ventilation layer and are set diagonally in a guide-blade-type manner for deflecting the air toward the cushioning surface in the direction of the top layer.

13. The cushioning according claim 2, wherein each of the top layer and the bottom layer have a honeycomb structure.

14. The cushioning according claim 13, wherein air guiding lamellae are arranged between the spacing webs or spacing threads with a tilting thereof which extends in at least one direction of the cushioning width and in the longitudinal direction of the cushioning.

15. The cushioning according claim 14, wherein the air guiding elements are arranged directly on the bottom layer.

16. The cushioning according claim 15, wherein the air guiding elements are arranged centrally of or below a center of the spacing webs or threads.

17. The cushioning according claim 16, wherein the introduction of air into the ventilation layer occurs on the bottom layer, and an area of the top layer which is situated opposite an area of the air introduction is covered by an air-impermeable blocking layer.

* * * * *